Figure 1:
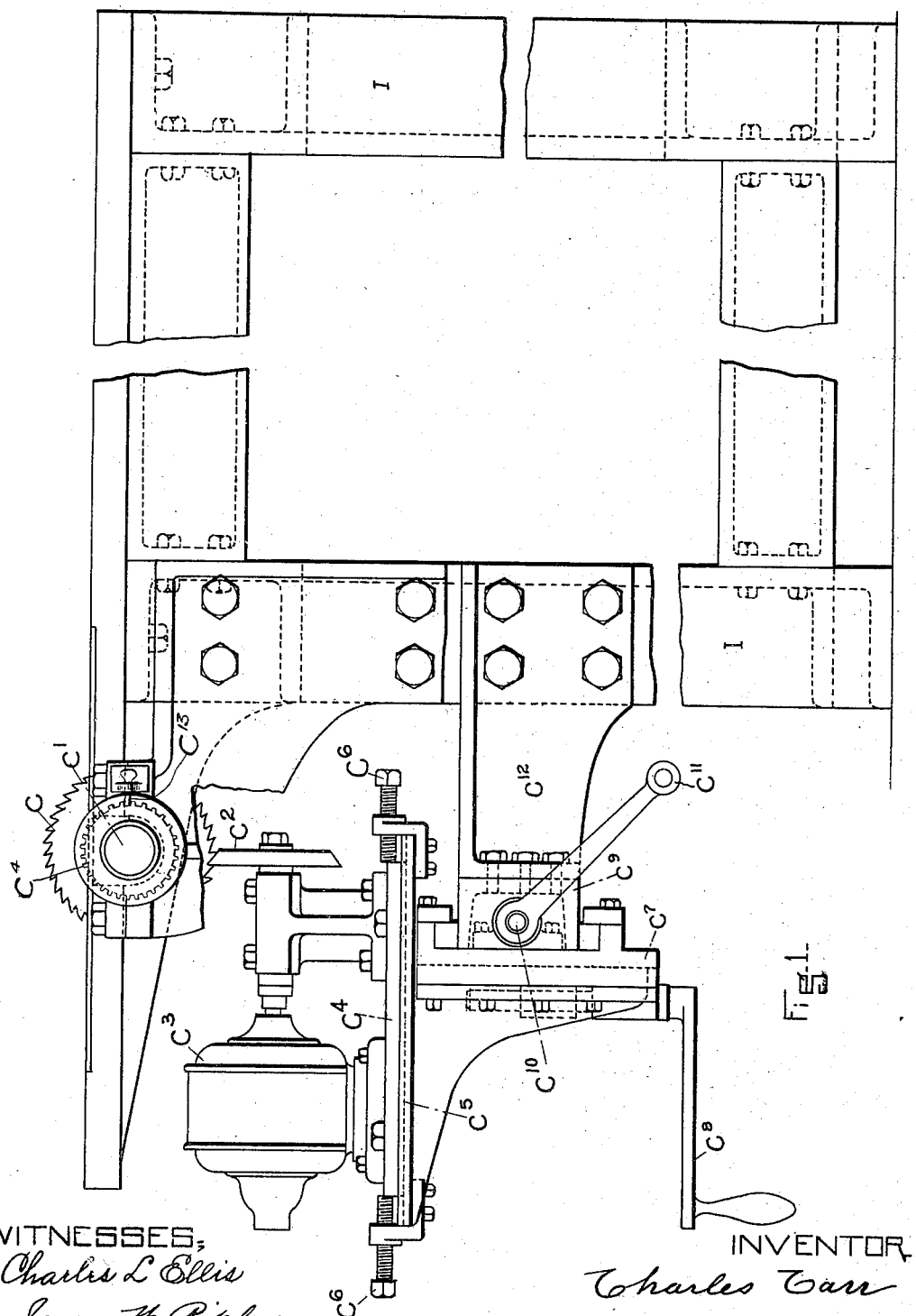

No. 639,358. Patented Dec. 19, 1899.
C. CARR.
MACHINE FOR SHARPENING GANGS OF SAWS.
(Application filed Mar. 2, 1899.)
(No Model.) 2 Sheets—Sheet 1.

WITNESSES:
Charles L. Ellis
James W. Ripley

INVENTOR
Charles Carr

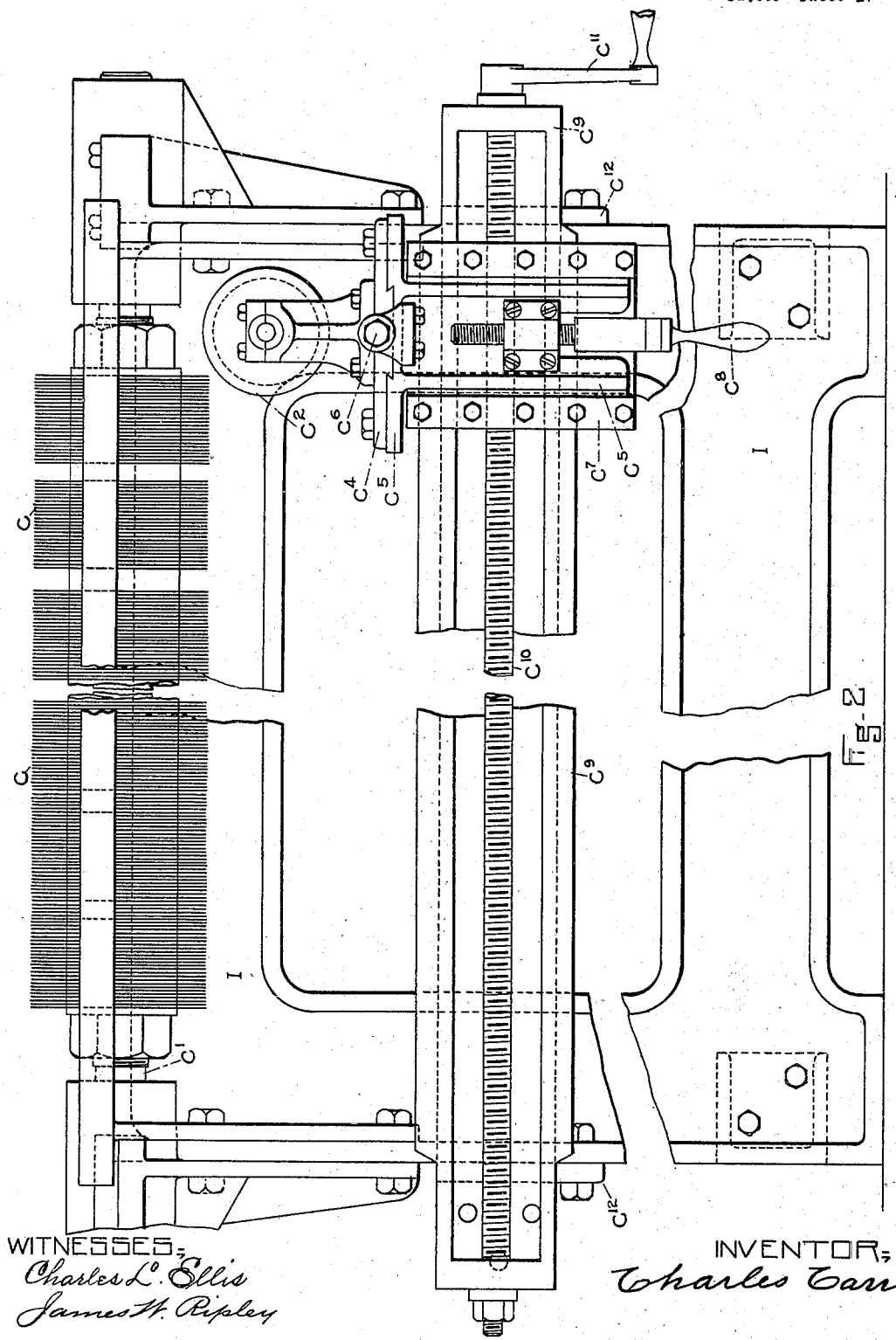

UNITED STATES PATENT OFFICE.

CHARLES CARR, OF BOSTON, MASSACHUSETTS.

MACHINE FOR SHARPENING GANGS OF SAWS.

SPECIFICATION forming part of Letters Patent No. 639,358, dated December 19, 1899.

Original application filed September 16, 1898. Serial No. 691,092. Divided and this application filed March 2, 1899. Serial No. 707,517. (No model.)

*To all whom it may concern:*

Be it known that I, CHARLES CARR, a citizen of the United States, residing at Boston, in the county of Suffolk and State of Massachusetts, have invented certain new and useful Improvements in Machines for Sharpening Gangs of Saws, of which the following is a specification.

This application is a division of application filed September 16, 1898, Serial No. 691,092—machine for making and boxing matches—which application was divided under direction of the Patent Office.

The primary object of my invention is to produce a mechanism for rapidly and economically sharpening the gangs of saws attached to machines for making match-splints, toothpicks, and the like; but my device may be applied for any machine of which gangs of saws, circular or upright, are a feature; and which device consists in the arrangement and combination of the several parts, as set forth in the following specification, taken in connection with the accompanying drawings, which form a part of this specification.

In the drawings, Figure 1 is a side elevation of a saw-table with a gang of saws, forming a part of any machine of which gangs of saws are an essential feature, and shows the saw sharpening or grinding device attached to the table in position to operate on the saws. Fig. 2 is a front elevation of the same.

A grinding-wheel $C^2$, of emery, carborundum, or other suitable substance, is secured to one end of a shaft, which is revolved by an electric motor $C^3$ or other equivalent motive power. The motor $C^3$ and the shaft-bearing are secured to the sliding plate $C^4$, which is attached to the bed-plate by bolts in such a manner as to be easily adjusted horizontally in proper position by means of the screws $C^6$.

The bed-plate $C^5$ is provided with a longitudinal groove to receive the sliding plate and is adjusted vertically in the cross-head slide $C^7$ by a screw operated by the crank $C^8$. The cross-head slide $C^7$ is moved transversely on the cross-head $C^9$ by means of the screw $C^{10}$, turned by the crank $C^{11}$. The cross-head $C^9$ is secured permanently or temporarily to the saw-table by the bracket $C^{12}$.

I do not limit myself to this precise arrangement of the various parts named, for some minor parts may be omitted and others added, as may be required by differences in the construction of the various machines to which the grinding device is to be applied, without affecting the essential features of my invention. Nor do I limit myself to the precise location of the grinding device as shown in its relation to the saw-arbor. This device is also applicable to the grinding of other than gangs of circular saws.

Operation: In the operation of grinding saws the saw-arbor $C'$ is held from turning by the detent or stop $C^{13}$. The grinding-wheel is then so adjusted by the means previously described or by equivalent mechanism that the beveled edge of the grinding-wheel engages one of the teeth of the first one of the gang of saws. The motor $C^3$ being started, the grinding-wheel is moved across the width of the saw-table by turning the crank $C^{11}$, and the edge of the wheel engages and grinds one tooth in succession of every saw in the gang, the saws being so mounted onto the arbor or in their frames that the teeth of each saw is in exact line with the corresponding teeth of all the other saws in the gang. When the farther end of the gang of saws has been passed by the grinding-wheel, the arbor is so turned or the saw-frame so moved as to present the next row of saw-teeth in position to be acted upon by the grinding-wheel, the motor is reversed and the wheel is driven through the next line of saw-teeth, but in the opposite direction. This transverse movement of the cross-head slide is thus continued until all the teeth of every saw have been sufficiently sharpened. The bur left by the grinding-wheel upon the edge of the saw-teeth acts as a "set" and projects on opposite sides in each alternate row of teeth, and thus the cut on the stock is sufficiently wide for clearance.

By means of the various adjusting movements described the relative angle of the beveled edge of the grinding-wheel may be so varied as to produce such a rake of the teeth of the saws as may be desirable. Thus by moving the slide $C^4$, (see Fig. 1,) carrying the grinding-wheel $C^2$, to the left from the center line of the saw-arbor and elevating the carriage $C^5$ to keep the wheel in contact with the saws more rake to the saw-teeth will be given, or by moving the carriage $C^4$ to the right and elevating the wheel to the saws less rake will be given to the saw-teeth.

Having described my invention, what I claim, and desire to secure by Letters Patent, is as follows:

1. In a machine for sharpening gangs of saws, a grinding-wheel of suitable substance having a beveled periphery, a motor coupled directly to the shaft or spindle of the grinding-wheel, a horizontally-moving sliding plate to which are rigidly secured the motor and bearings of the grinding-wheel shaft, screws to adjust the movement of the sliding plate in the grooves of the bed-plate, a vertically-moving bed-plate, grooved to receive the sliding plate, a cross-head slide in which the bed-plate can be moved vertically by means of a screw and crank, a cross-head having a longitudinal screw with crank whereby the cross-head slide can be moved from end to end of the cross-head, parallel to the saw-arbor, and the brackets for attaching the cross-head to the saw-table, substantially as shown and described.

2. In a machine for sharpening gangs of saws, in combination with a saw-table bearing an arbor on which are saws, and provided with a stop or detent for limiting the movement of the saws to a tooth movement, a grinding-wheel of emery or like substance, an electric motor coupled directly to the shaft of the grinding-wheel and the described means for adjusting the relative position an angle of the grinding-wheel to the saws so as to grind and sharpen the teeth of the saws to any depth or rake, while they are held motionless by a detent and with their teeth in alinement substantially as shown and described.

3. In a machine for sharpening gangs of saws, in combination with a saw table or frame having gangs of saws mounted thereon, a detent attached to the table or frame, a grinding-wheel driven by an electric motor; means for adjusting the grinding-wheel to engage the teeth of the saws at any angle or depth; mechanism for moving the grinding-wheel parallel to the saw-arbor, from side to side, while the saws are held stationary by the detent, whereby the grinding-wheel may grind all of the saws in alternate rows and its reversed rotary motion forming "burs" on alternate sides, substantially as and for the purpose described.

4. In a machine for sharpening gangs of saws, the combination of the beveled-edge grinding-wheel $C^2$ its operating-motor $C^3$, the detent-wheel $C^{14}$, the detent $C^{13}$, the horizontally-sliding plate $C^4$ carrying the grinding-wheel and motor, the vertically-movable bed-plate $C^5$, the transversely-movable cross-head slide $C^7$ and the operating screws and cranks, substantially as and for the purpose described.

5. In a machine for sharpening gangs of saws, in combination with a saw-arbor carrying gangs of saws, a beveled-edge grinding-wheel $C^2$, its direct-connected driving-motor $C^3$, the grinder-adjusting sliding plate $C^4$, mounted on the sliding plate $C^5$, cross-head slide $C^7$, elevating screw and crank $C^8$, cross-head $C^9$, screw $C^{10}$, crank $C^{11}$, detent-wheel $C^{14}$, detent $C^{13}$ as and for the purpose described.

CHARLES CARR.

Witnesses:
CHARLES L. ELLIS,
JAMES W. RIPLEY.